Sept. 15, 1931.  J. L. HONEYCUTT  1,823,198
MOTE AND WASTE CLEANER
Filed Jan. 31, 1930  3 Sheets-Sheet 1
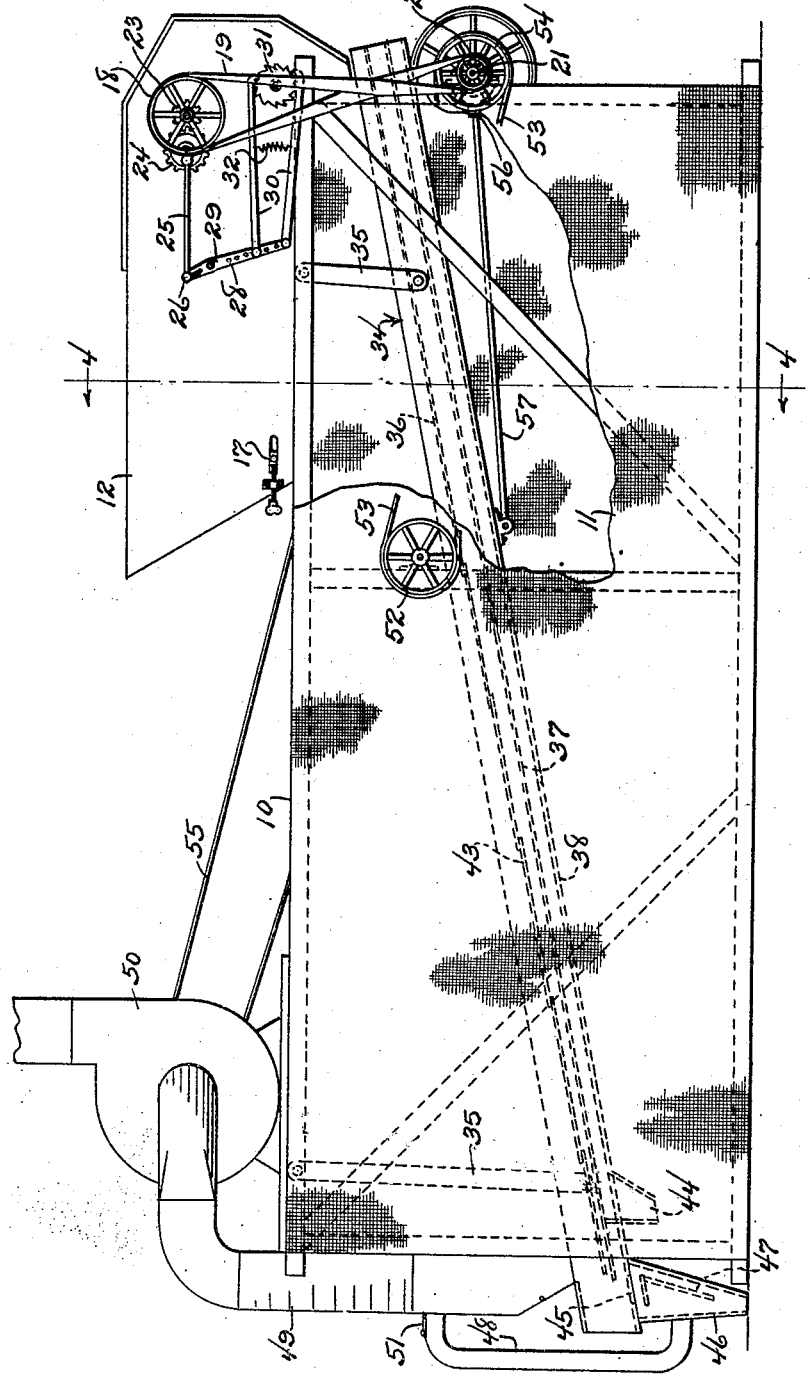
James L. Honeycutt INVENTOR
BY Victor J. Evans
ATTORNEY Sept. 15, 1931.    J. L. HONEYCUTT    1,823,198
MOTE AND WASTE CLEANER
Filed Jan. 31, 1930    3 Sheets-Sheet 2
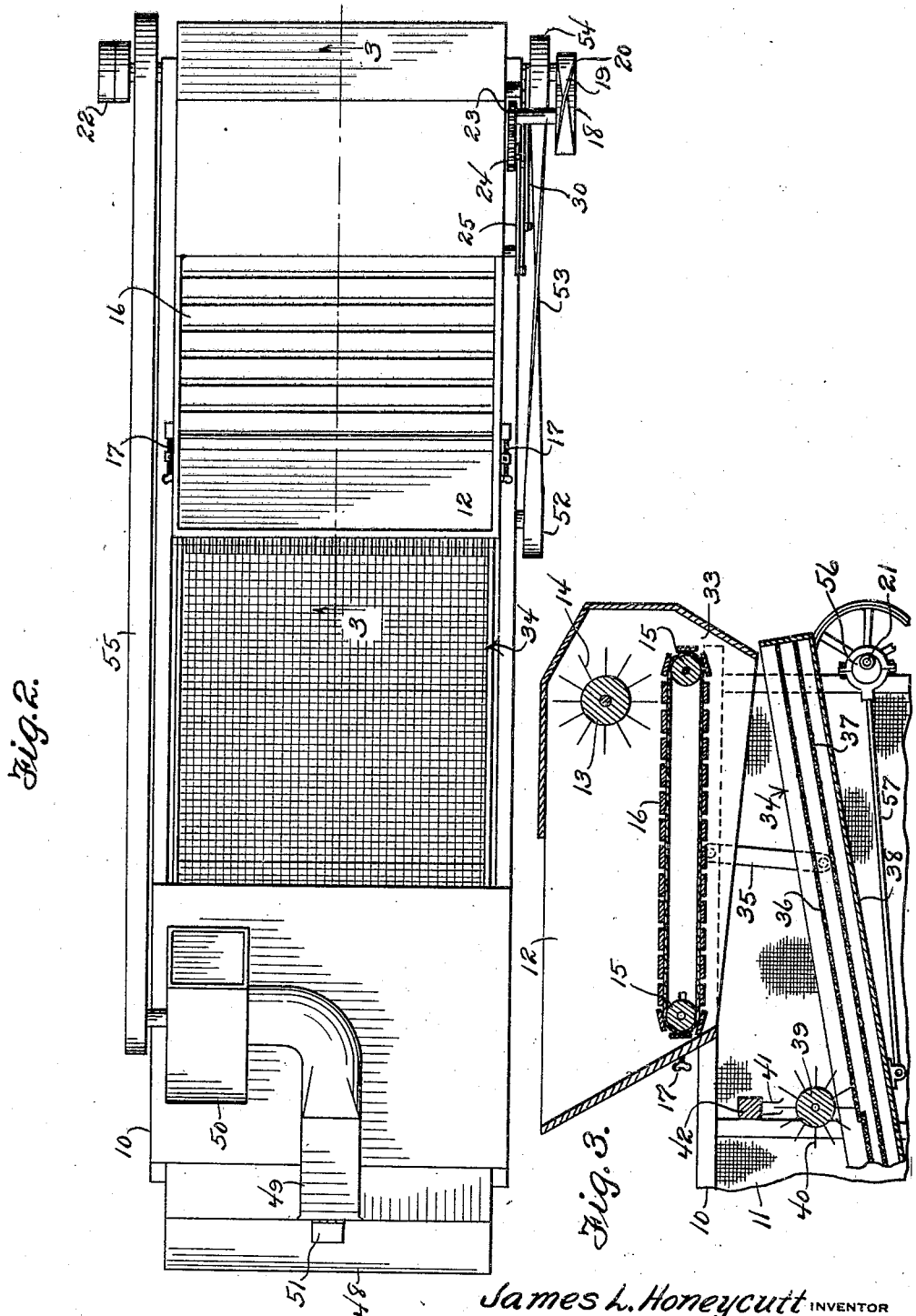
James L. Honeycutt INVENTOR
BY Victor J. Evans
ATTORNEY Sept. 15, 1931.  J. L. HONEYCUTT  1,823,198
MOTE AND WASTE CLEANER
Filed Jan. 31, 1930  3 Sheets-Sheet 3
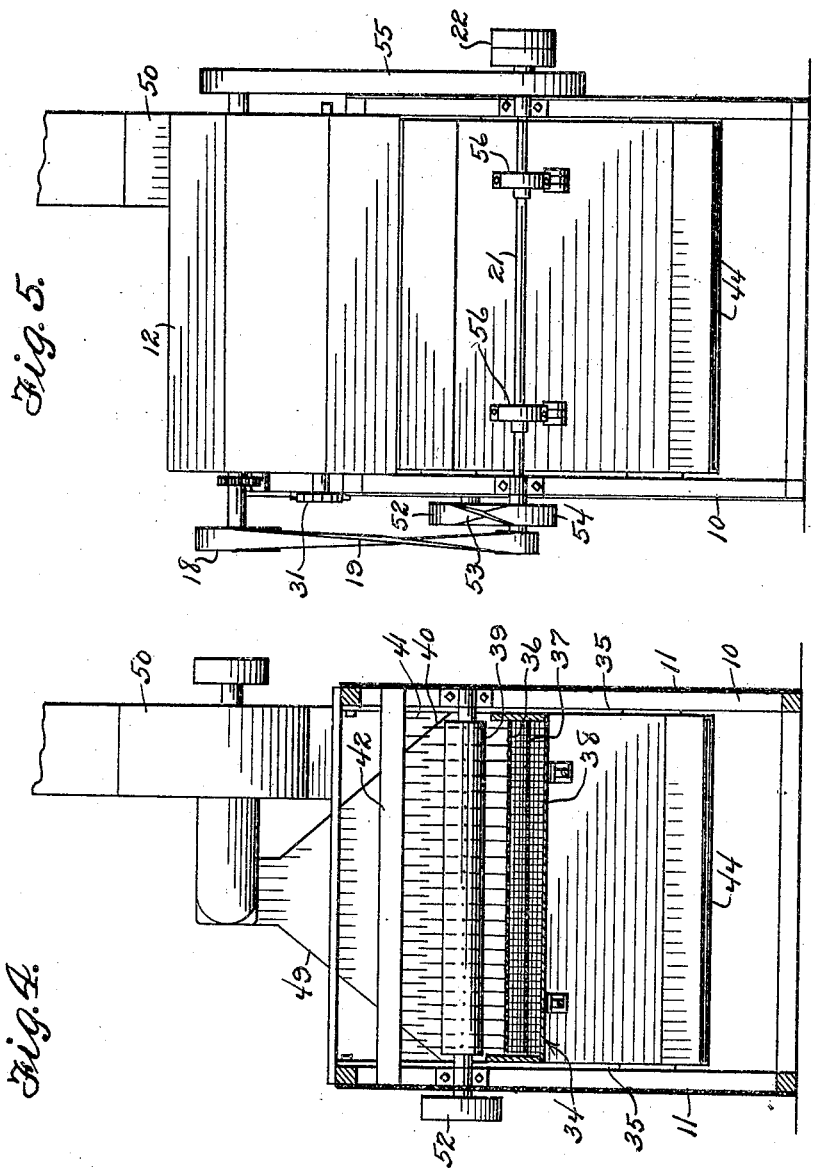
James L. Honeycutt
INVENTOR
BY Victor J. Evans
ATTORNEY Patented Sept. 15, 1931

1,823,198

UNITED STATES PATENT OFFICE

JAMES L. HONEYCUTT, OF MOORESVILLE, NORTH CAROLINA

MOTE AND WASTE CLEANER

Application filed January 31, 1930. Serial No. 424,941.

This invention relates to cleaning machines, an object being to provide a machine by means of which cotton seed and waste ordinarily lost in sweepings may be cleaned and reclaimed.

Another object of the invention is the provision of a machine in which the sweepings or waste is subjected to a beating action when fed to the machine, and thereafter subjected to a tearing or separating action, during which the larger pieces of cotton waste are separated from the remaining material and the seed is torn from the waste and gathered by a screen of novel construction, so that all seed and heavy material will pass to the bottom of the screen, the seed passing through the screen and the waste material remaining upon said screen.

The invention further includes a screen for catching the seed and separating the latter from sand and other fine relatively heavy material, after which the seed and sand are separately discharged from the machine and the fine lint blown from the seed during the discharging operation.

The invention further includes novel means for feeding the material to the machine, wherein a constantly operating beater roll cooperates with an intermittently operated endless apron to break up and separate the matted mass before it is acted upon by the tearing or separating roll.

With the above and other objects in view, the invention further includes the following novel features and details of construction, to be hereinafter more fully described, illustrated in the accompanying drawings and pointed out in the appended claim.

In the drawings:—

Figure 1 is a side elevation partly broken away and showing a machine constructed in accordance with the invention.

Figure 2 is a top plan view of the same.

Figure 3 is a fragmentary sectional view on the line 3—3 of Figure 2.

Figure 4 is a section on the line 4—4 of Figure 1.

Figure 5 is an end view.

Referring to the drawings in detail wherein like characters of reference denote corresponding parts, the reference character 10 indicates the frame of the machine whose side walls 11 are formed of screen material. These walls, may if desired, be provided with dust-proof cloth hangers (not shown).

Mounted upon the frame of the machine is a feed hopper 12 within which is arranged a beater roll 13, the latter including radially disposed arms or fingers 14. Also arranged within the hopper are spaced rollers 15 over which operates an endless apron 16, the latter being formed of slats mounted upon a suitable belt. Tensioning means 17 is provided whereby the tension of the belt may be regulated.

Located upon the outside of the hopper and fast upon the shaft of the roll 13 is a pulley 18. This pulley is driven by a belt 19 from a pulley 20, the latter being mounted upon a shaft 21 upon which is mounted fast and loose pulleys 22, so that power may be supplied to the shaft from any suitable source.

Also fast upon the shaft of the roll 13 is a pinion 23 which engages and drives a gear 24. Eccentrically connected to this gear 24 is a pitman 25 and the later has a pivotal and adjustable connection with one end of a lever 28. This lever is pivotally mounted as shown at 29 and has pivotally and adjustably connected thereto the inner ends of dogs 30 which engage a toothed wheel 31 fast upon the shaft of one of the rollers 15. A spring 32 holds these dogs in engagement with the toothed wheel 31.

By reference to Figures 1 and 3 of the drawings it will be seen that as the pulley 18 is driven, a rocking motion will be imparted to the lever 28, so that the dogs 30 will intermittently operate the apron 16 and impart a step by step movement to this apron. The length of this movement may be governed by adjusting the dogs 30 upon the lever 27 and the throw of this lever may be regulated by adjusting the connection of the pitman with the lever 27. As the roll 13 continues in its operation and the apron 16 is intermittently moved, material within the hopper will be acted upon in such manner that the said material, which is in the form of a matted mass, will be spread out over the apron and be fed into the machine proper through the passage 33.

Located within the machine is a shoe 34. This shoe includes imperforate side and bottom walls and is supported for rocking movement by hangers 35.

This shoe 34 carries a top screen 36 and a bottom scren 37 which is spaced therefrom and spaced from the bottom 38 of the shoe.

Mounted above the top screen 36 is a tearing or separating roll 39 which includes radially extending fingers 40. These fingers operate in close proximity to the surface of the screen 36 and cooperate with this screen and with curved fingers 41 which are spaced transversely of the machine and extend downwardly from a bar 42.

The screen 36 is of novel construction being composed of stepped sections 43 and terminates short of the end of the shoe 34 whose lower end is open. The bottom of the shoe is provided with a discharge spout 44 and a discharge opening 45 which communicates with a discharge spout 46. Pivotally mounted in this discharge spout is a plate 47 which is arranged in opposed relation to the end of an air pipe 48. This pipe communicates with an air conduit 49 which receives air from a blower 50, while the pipe 48 is supplied with a regulating damper 51.

The roll 39 has mounted upon its shaft a pulley 52 which is driven by a belt 53 from a pulley 54 which is mounted upon the shaft 21, while a belt 55 drives the blower 50 from the shaft 21.

The shaft 21 has mounted thereon an eccentric 56 which is connected by means of a pitman 57 with the shoe 34 so as to oscillate the shoe.

The material is fed from the hopper to the screen 36 in the manner previously explained and passed downward to the tearing and separating roll 39, the fingers 40 of this roll carrying the long strands of waste to the fingers 41 and tearing or separating the waste so as to separate therefrom the cotton seed. The seed and waste falls upon the screen 36 and due to the action of this screen and the stepped sectional formation thereof, the seed and other relatively heavy material pass to the bottom of the mass and through the screen 36, the cotton waste, burrs, etc., remaining upon the screen and passing downward to the outer discharge end of the shoe. Salable cotton is picked up by the air draft.

The seed and other heavy material fall upon the screen 37 and gravitate downward and outward, the seed passing off of the end of the screen 37 through the opening 45 where they are subjected to the air blast from the pipe 48. This air blast removes fine particles of lint so that the seed passing out of the discharge shoe 46 is thoroughly cleaned. The sand and other fine heavy material passes through the screen 37 to the bottom 38 of the shoe and outward through the discharge spout 44.

The invention is susceptible of various changes in its form, proportions and minor details of construction and the right is herein reserved to make such changes as properly fall within the scope of the appended claim.

Having described the invention what is claimed is:—

A mote and waste cleaner comprising an elongated and closed frame, a hopper on the top of said frame and located adjacent one end thereof, a power driven shaft on the frame, an endless apron driven in a step by step movement from the shaft and located in the hopper to receive matted cotton waste and seeds, a combing roller journalled in the hopper to shed the waste, means driving the roller from the shaft, an inclined reciprocating screen in the frame with its highest end disposed under the hopper and its lowest end disposed at the end of the frame remote to the hopper to receive the waste and seeds from the apron, a combing roller for separating the seeds from the waste, stationary teeth carried by the frame and cooperating with the second named combing roller in separating the seeds from the waste, and a suction means at the lowest end of the screen and at the last named end of the frame to remove cotton lint from the waste.

In testimony whereof I affix my signature.

JAMES L. HONEYCUTT.